United States Patent
Olson

(10) Patent No.: US 12,324,380 B1
(45) Date of Patent: Jun. 10, 2025

(54) SYSTEM AND METHOD OF FLOW RATE MANAGEMENT AND CONTROL WITHIN AN IRRIGATION CORNER ASSEMBLY

(71) Applicant: Valmont Industries, Inc., Omaha, NE (US)

(72) Inventor: Andrew T. Olson, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 633 days.

(21) Appl. No.: 17/590,341

(22) Filed: Feb. 1, 2022

Related U.S. Application Data

(60) Provisional application No. 63/154,920, filed on Mar. 1, 2021.

(51) Int. Cl.
  *A01G 25/16* (2006.01)
  *A01G 25/09* (2006.01)
(52) U.S. Cl.
  CPC ............ *A01G 25/16* (2013.01); *A01G 25/09* (2013.01)
(58) Field of Classification Search
  CPC ................................ A01G 25/16; A01G 25/09
  USPC .......................................................... 700/284
  See application file for complete search history.

(56) References Cited

U.S. PATENT DOCUMENTS

| | | | |
|---|---|---|---|
| 2004/0093912 A1* | 5/2004 | Krieger | A01G 25/092 68/19 |
| 2013/0218873 A1* | 8/2013 | Lassley | G06F 16/29 707/722 |
| 2016/0219807 A1* | 8/2016 | Köhler | G05B 19/0426 |
| 2017/0156273 A1* | 6/2017 | Whalley | B05B 1/20 |
| 2018/0054982 A1* | 3/2018 | Whalley | A01G 25/16 |
| 2019/0021246 A1* | 1/2019 | Neesen | A01G 25/165 |
| 2019/0104696 A1* | 4/2019 | Fischman | A01G 25/092 |
| 2019/0350145 A1* | 11/2019 | Kastl | A01G 25/16 |
| 2020/0315111 A1* | 10/2020 | Moeller | G05B 13/0265 |
| 2021/0169025 A1* | 6/2021 | Burgard | G06T 7/0012 |

\* cited by examiner

*Primary Examiner* — Chun Cao
(74) *Attorney, Agent, or Firm* — Milligan PC LLO

(57) ABSTRACT

The present invention provides a system and method for irrigation management and, more particularly, to a system and method for managing and controlling flow rate within an irrigation corner assembly. According to a first preferred embodiment, the present invention teaches a method comprising the steps of: recording irrigation system and irrigation field data; performing a simulated pass around a field and executing a simulated irrigation plan along a selected guidance path; determining the current and maximum sprinkler areas for at least one corner sprinkler at selected points/increments along the selected guidance path; determining the current and maximum extension ratios for the selected sprinklers at the selected increments; calculating the duty cycle for each sprinkler at each selected increment along the corner guidance path based on the determined sprinkler areas and extension ratios; recording calculated duty cycles in a look-up table for each corner sprinkler at each referenced pivot angle; executing the irrigation plan; and setting the valve duty cycles for each corner sprinkler to the tabulated values at each referenced pivot angle.

18 Claims, 6 Drawing Sheets

SYSTEM AND METHOD OF FLOW RATE MANAGEMENT AND CONTROL WITHIN AN IRRIGATION CORNER ASSEMBLY

RELATED APPLICATIONS

The present application claims priority to U.S. Provisional Application No. 63/154,920 filed Mar. 1, 2021.

BACKGROUND AND FIELD OF THE PRESENT INVENTION

Field of the Present Invention

The present invention relates generally to a system and method for irrigation management and, more particularly, to a system and method of sprinkler flow rate management and control within an irrigation corner assembly.

BACKGROUND OF THE INVENTION

Center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray or release water (or other applicants) in a desired pattern. Optionally, end guns may be attached to the end of any irrigation span to add further coverage.

Sprinkler package designs rely upon a careful matching of sprinkler specifications and irrigation system specifications to deliver predictable, uniform water application across the irrigated area. Having uniform water application from the irrigation system reduces water waste and increases the potential yield of the crop being grown.

Corner machines that can optionally be attached to both linear and pivot systems serve to increase the portion of irrigated area inside of a given field boundary. In order to accomplish the movement necessary to follow a given guidance path, a corner machine must be capable of moving faster than the main irrigation machine (i.e. to extend and thus increase the effective length of the irrigation machine), and moving slower than the main irrigation machine (i.e. to retract and shorten the effective length of the irrigation machine). To cause the corner to extend, retract, or hold constant, the system operates to control the steering angle of at least one steerable drive unit (SDU).

The changes in corner angles relative to the base irrigation system, coupled with the speed changes required to extend and retract the corner system, generally necessitates a special control system for the sprinklers attached to the corner machine. These special control systems are used to improve the application uniformity, but most are plagued with a variety of problems. Accordingly, such systems commonly result in relatively poor application uniformity due to inaccurate algorithms coupled with other factors. The result is poor water application uniformity in the portion of the field irrigated by the corner arm assembly.

To overcome the limitations of the prior art, a system is needed which is able to control duty cycles and average sprinkler flow rates in a corner arm assembly in an efficient and cost-effective manner.

SUMMARY OF THE PRESENT INVENTION

To address the shortcomings presented in the prior art, the present invention provides a system and method for managing and controlling the flow of liquids within an irrigation corner assembly. According to a first preferred embodiment, the present invention teaches a method comprising the steps of: recording irrigation system and irrigation field data; performing a simulated pass around a field and executing a simulated irrigation plan along a selected guidance path; determining the current and maximum sprinkler areas for at least one corner sprinkler at selected points/increments along the selected guidance path; determining the current and maximum extension ratios for the selected sprinklers at the selected increments; calculating the duty cycle for each sprinkler at each selected increment along the corner guidance path based on the determined sprinkler areas and extension ratios; recording calculated duty cycles in a lookup table for each corner sprinkler at each referenced pivot angle; executing the irrigation plan; and setting the valve duty cycles for each corner sprinkler to the tabulated values at each referenced pivot angle According to a further preferred embodiment, the present invention preferably provides a corner irrigation system having sprinklers with valves which are individually controllable to match a stored irrigation plan. According to a further preferred embodiment, the system of the present invention preferably incorporates a group of sprinklers which are rated to have a maximum flow rate which exceeds the needed applicant flow rates for a given stored irrigation plan. Thereafter, the system of the present invention preferably determines the maximum flow rate for each given sprinkler and adjusts the duty cycles of each sprinkler (or groups of sprinklers) to match the application rates prescribed in the irrigation plan based on the determined sprinkler areas and extension ratios.

According to further preferred embodiments, the maximum extension angle and the maximum extension ratio are preferably determined over a set period and used as the basis for the nozzle sizing of each sprinkler on the corner span. Accordingly, each individual nozzle is selected and sized based on the flow rate calculated for the maximum flow rate moment which occurs when the corner system is approaching its maximum extension angle (angle between the corner span and the main span), while still extending at a maximum extension ratio (current limit is 2:1). Thereafter, the duty rates of each sprinkler are then adjusted based on the ratio of the currently required flow rate to the maximum flow rate.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
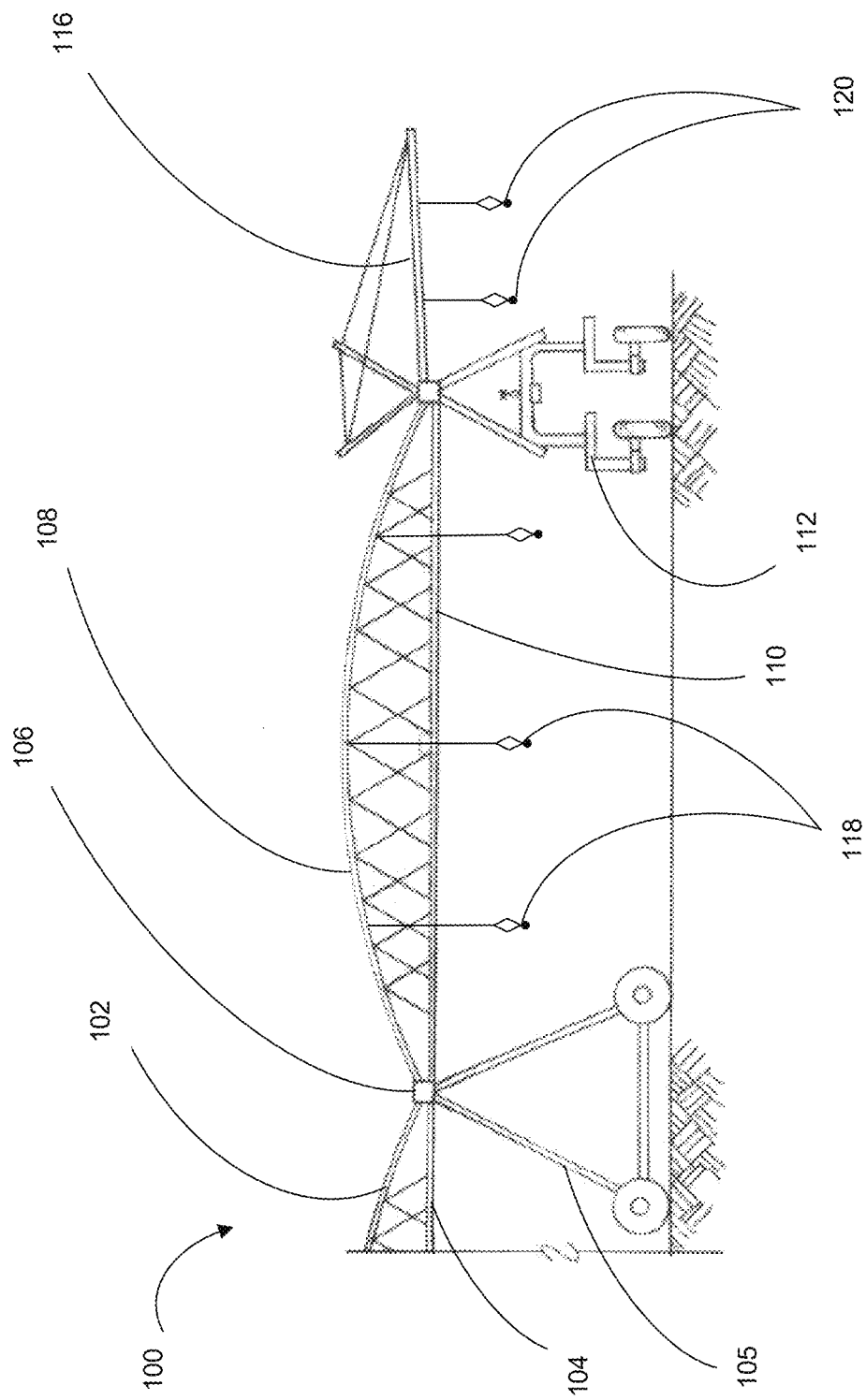
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

As shown in FIG. 1, the exemplary system 100 may include a pipeline 102 and a main section assembly 104 (irrigation section assembly) coupled (e.g., connected) to the pipeline 102. The pipeline 102 may have access to a ditch, well, water repository (e.g., water tank), or other fluid source, to furnish water to the irrigation system 100. For instance, the pipeline 102 may be pressurized to facilitate the transfer of water from the water source to the main section assembly 104. The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like.

As shown, the main section assembly 104 may preferably include a number of interconnected spans (not shown) supported by one or more drive towers (including a Last Regular Drive Unit ("LRDU") 105 as shown). Preferably, the drive towers may be any tower configuration known in the art to adequately support the conduits (e.g., water pipe sections) described herein. It is understood that the section assembly 104 may include any number of spans and tower structures without limitation. In an implementation, the wheels of each drive tower may be driven by any suitable drive unit (e.g., drive motor), or the like, to assist in traversing the system 100 about the specified area.

As further shown in FIG. 1, the main section assembly 104 may preferably be attached to a corner span assembly 110 which may support a corner span pipe assembly 108 to provide applicants to one or more sprinklers 118. As further shown, the corner span 110 is preferably attached to the LRDU at a connection point 106 which allows the corner span 102 to laterally rotate from the connection point 106. According to a further preferred embodiment, the lateral movement of the corner span 110 may preferably be propelled by at least one corner drive unit ("SDU") 112. According to a further preferred embedment, the corner span 110 may preferably further connected to a spray boom 116 which may further provide applicants to one or more additional sprinklers 120 and/or endguns (not shown).

Figure 2:
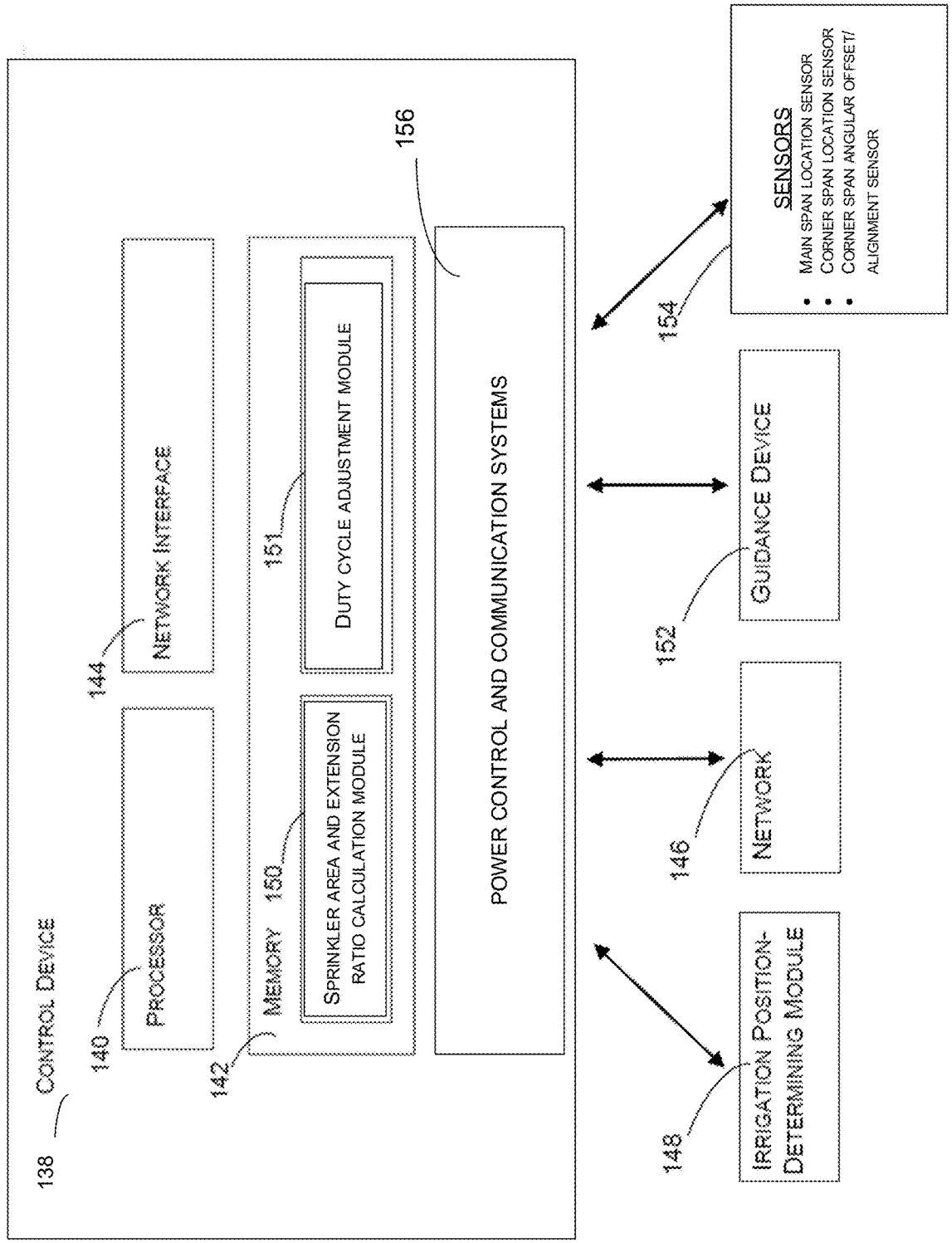
FIG. 2 shows a block diagram illustrating the exemplary processing architecture of a control device in accordance with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, one or more processing modules 150, 151 and a network interface 144. The processor 140 preferably may provide processing functionality for the control device 138 and may include any number of processors, micro-controllers, or other processing systems.

The processor 140 may further execute one or more software programs that implement techniques described herein. The memory 142 may be an example of tangible computer-readable media that provides storage functionality to store various data associated with the operation of software programs and code segments mentioned above, or other data to instruct the processor 140 and other elements of the control device 138 to perform the steps described herein. The memory 142 may preferably include, for example, removable and non-removable memory elements such as RAM, ROM, Flash (e.g., SD Card, mini-SD card, micro-SD Card), magnetic, optical, USB memory devices, and so forth. The network interface 144 preferably provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. Further, the control device 138 may preferably further include a power control and communications system 156 for transmitting and receiving data and control signals from elements throughout the irrigation system 100 as discussed further below.

As further shown, a preferred embodiment of the present invention preferably further includes a SPRINKLER AREA AND EXTENSION RATIO MODULE 150 which preferably receives location and movement data from elements of the irrigation system, as well as angular/alignment measurements and detection signals from a variety of system sensors 146-154. For example, the system may preferably further include a variety of alignment/location sensor including: a main span location sensor; a corner span location sensor; corner span angular offset sensor; span alignment sensors; and the like. From the selected data, the SPRINKLER AREA AND EXTENSION RATIO MODULE 150 may preferably calculate the maximum and current sprinkler areas and extension rations for each sprinkler/sprinkler group. According to a preferred embodiment, the SPRINKLER AREA AND EXTENSION RATIO MODULE 150 may make these calculations by applying Formulas 1.1-1.8 as discussed further below.

According to a further preferred embodiment, the calculations of the SPRINKLER AREA AND EXTENSION RATIO MODULE 150 may be provided to a DUTY CYCLE ADJUSTMENT MODULE 151 which may calculate and adjust the duty cycles of each sprinkler to match the application rates prescribed in a given irrigation plan based on the determined sprinkler areas and extension ratios over a range of reference pivot angles.

According to a preferred embodiment, the duty cycles may preferably be tabulated and stored in a look-up table which may include the prescribed duty cycle settings for each sprinkler at each reference pivot angle for a given irrigation plan. Thereafter, the stored duty cycles may be implemented during the execution of the irrigation plan as the irrigation machine progresses through each pivot angle. To control each sprinkler, the control device 138 may preferably be linked to the power control and communications systems 156 of the irrigation machine including any pressure boosting systems. Further, the Adjustment Module 151 may preferably be further linked to systems which control and adjust endgun settings/parameters.

According to alternative embodiments, instead of (or in addition to) adjusting duty cycles to control flow rates, the system of the present invention may alternatively tabulate, store, adjust and implement various selected settings for one or more variable area nozzles/sprinklers to control flow rates. In this way, the system of the present invention may further calibrate and incrementally adjust the flow rates of the present invention to the desired values as further discussed herein.

Figure 3:
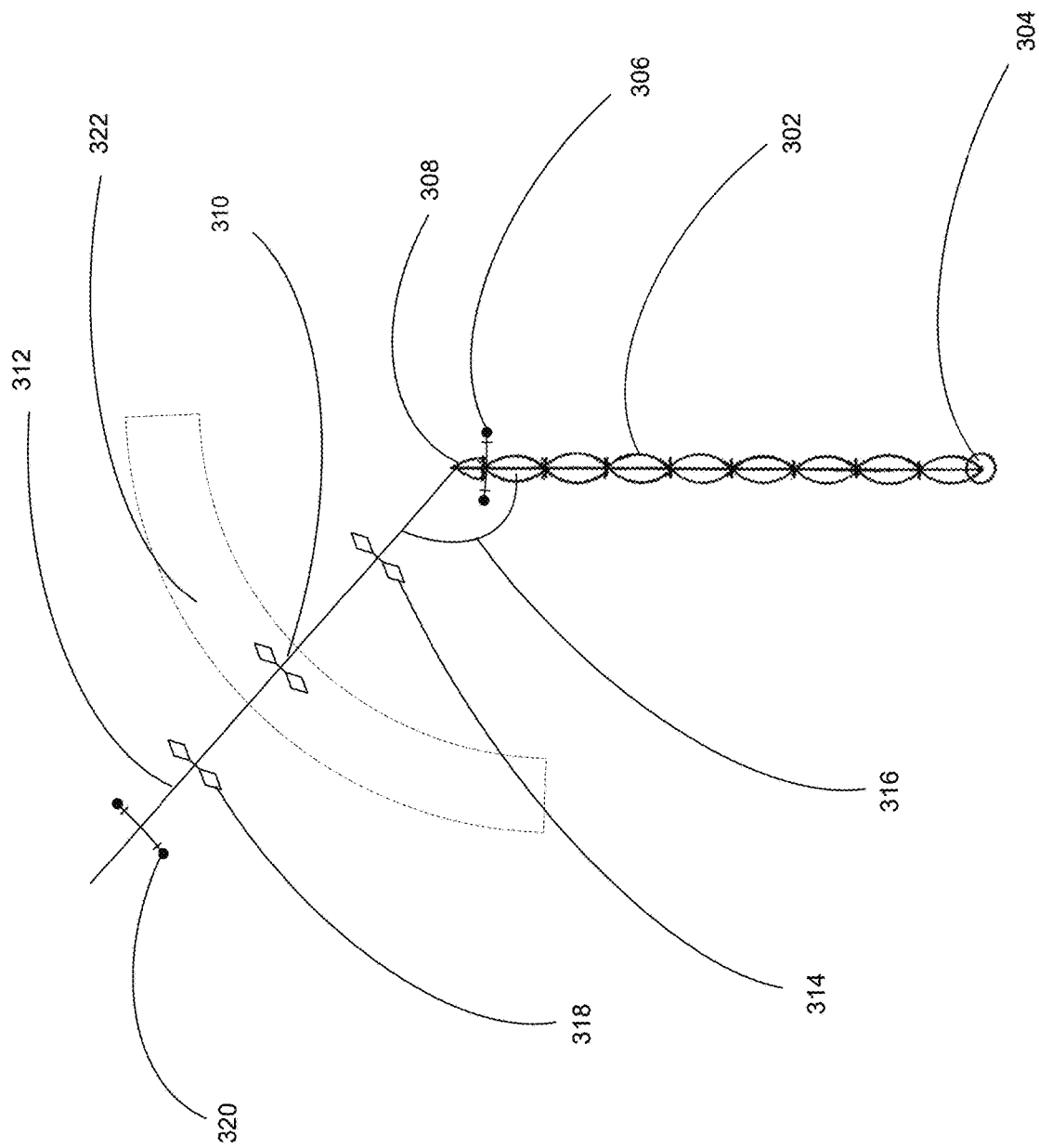
FIG. 3 is an overhead view of an example irrigation system in accordance with a further preferred embodiment of the present invention.
Figure 4:
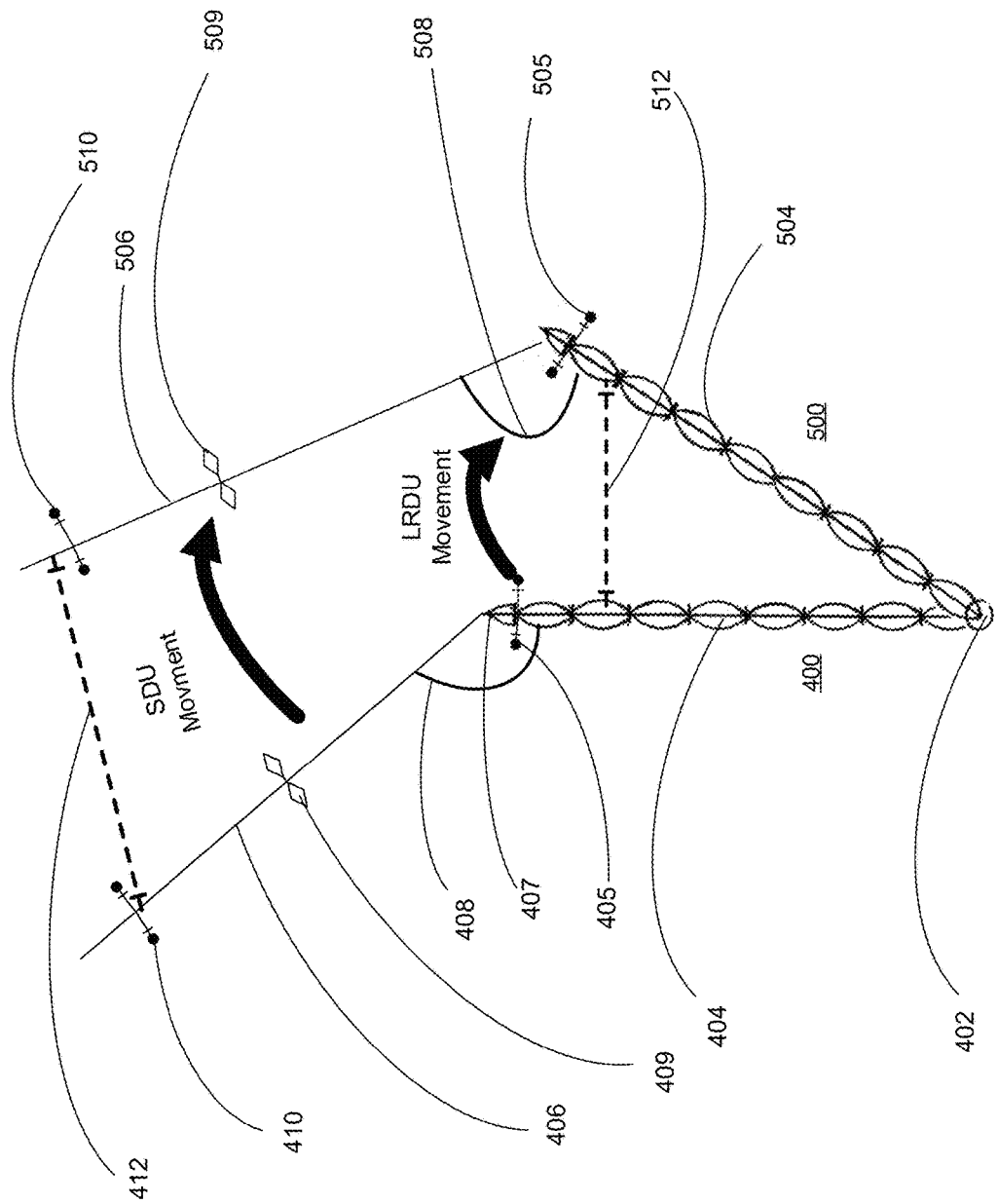
FIG. 4 shows overhead views of the example irrigation system shown in FIG. 3 in a first position and a second position.
Figure 5:
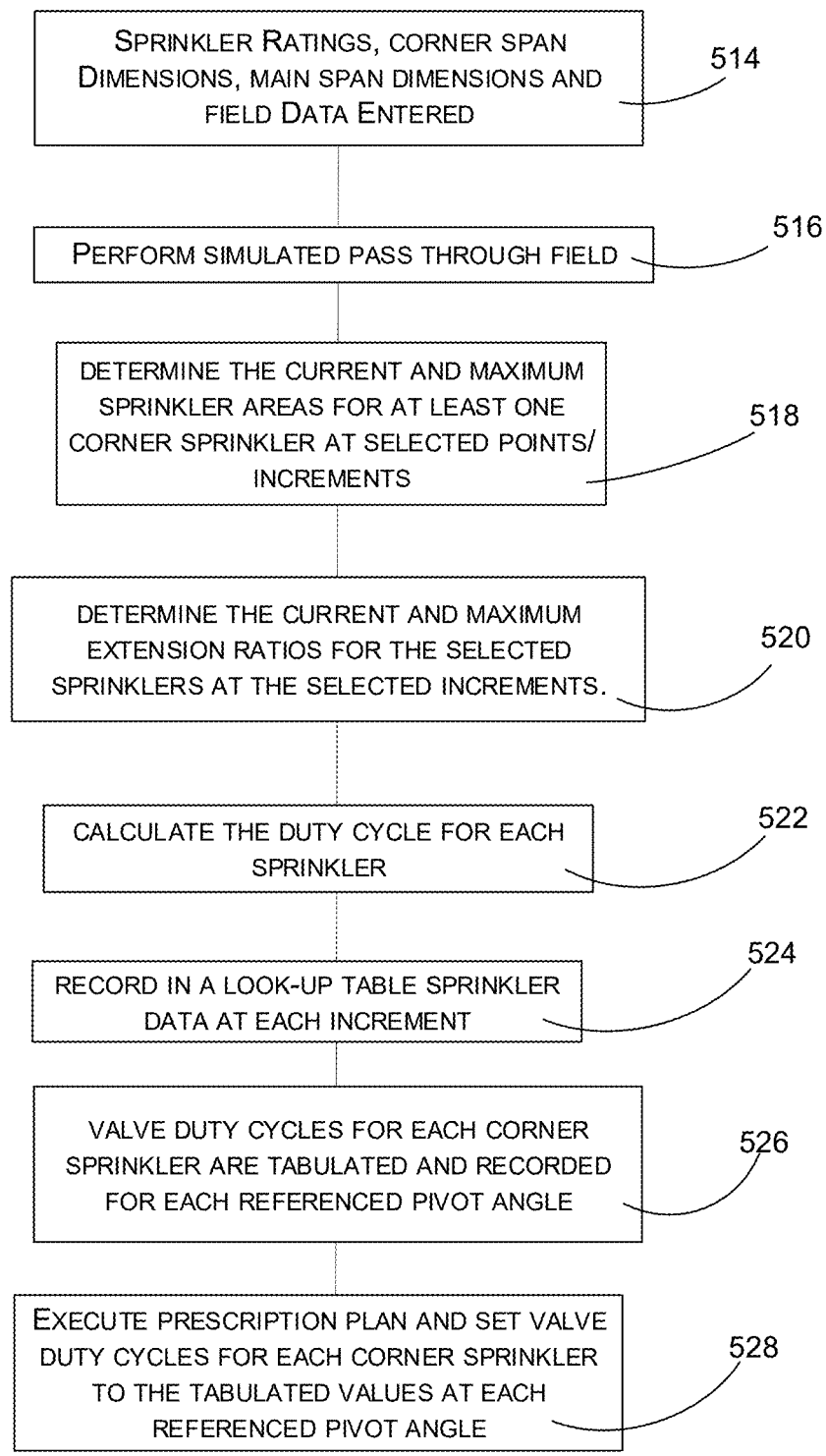
FIG. 5 is a block diagram illustrating exemplary steps of a method in accordance with a first preferred embodiment of the present invention.

With reference now to FIGS. 3-5, an exemplary system incorporating aspects of the present invention shall now be further discussed. With reference now to FIG. 3, the present invention shall now be discussed with reference to an overhead view of an irrigation span 302 which includes a center pivot 304 and a LRDU 306 for moving the irrigation span 302. As discussed above, the center pivot 304 may alternatively be a linear cart or the like. As further shown, the irrigation span 302 is further connected to a corner coupling mechanism 308 for connecting the irrigation span 302 to a corner irrigation span 312. As shown, the corner irrigation span 312 is shown offset by a corner angle 316 from the orientation of the main irrigation span 302. As further shown, the corner irrigation span 312 includes a corner drive tower 320 for moving the corner span 312 over a given arc. As further shown, the corner span 312 preferably further includes a set of sprinklers 310, 314, 318 which receive water (or other applicants) under pressure from the main machine 302. As shown, each exemplary sprinkler 310 is rated to apply a given amount of irrigation to a given irrigation area 322.

With reference now to FIG. 4, the exemplary irrigation system shown in FIG. 3 is shown in a first irrigation position 400 and a second irrigation position 500. In the first position 400, the irrigation system is shown with the main span 404 connected to a pivot point 402 and having a LRDU 405. As further shown, the irrigation system 400 as shown further includes a corner span 406 connected (via a corner coupling mechanism 407) to the main span 404. As shown, the corner span 406 is offset by a given corner angle 408 from the main span 404. As further shown, the corner span 406 further includes a steerable drive unit (SDU) 410 and an exemplary sprinkler 409.

With further reference to FIG. 4, the irrigation span of the present invention is further shown in a second position 500 in which the LRDU 505 of the main span 504 has been moved a given distance 512. Further, the SDU 510 of the corner span 506 has moved a given distance 412 to produce a second corner angle 508 which is different from the first corner angle 408. As further shown, the corner span 506 further includes an exemplary sprinkler 509.

As discussed above, at the first position 400 discussed above, the exemplary sprinkler 409 receives water at a given pressure. The water flow rates may be detected and/or extrapolated by the system based on pressures and parameters initially input into the system. They may further be determined based on a look-up table inputted into the system as discussed further below.

Regardless of how the initial flow requirements are determined, adjustments to system flow rates/duty cycles shall preferably be evaluated and determined in accordance with the present invention as discussed further below. In particular, the adjustments to the flow rate/duty cycles used within the irrigation system of the present invention may preferably be based primarily on a comparison of determined sprinkler areas and/or extension ratios of the irrigation system executing a given irrigation plan. As discussed above, instead of (or in addition to) adjusting duty cycles to control flow rates, the system of the present invention may alternatively adjust one or more variable area nozzles/sprinklers in an equivalent matter.

According to a first preferred embodiment, the system of the present invention preferably adjusts the duty rates for individual sprinklers and/or groups of sprinklers based on factors which are measured independently from the flow rate of the irrigation system. With reference now to FIG. 5, a method for setting the duty rates shall now be further discussed. As shown in FIG. 5, at a first step 514, the irrigation and field data may preferably be entered including data such as: sprinkler ratings, corner span dimensions, main span dimensions and field data. At a next step 516, the system of the present invention may then preferably make a simulated pass around a given field. At a next step 518, the system may then determine the current and maximum sprinkler areas for at least one corner sprinkler at selected points/increments along a selected guidance path. At a next step 520, the system may determine the current and maximum extension ratios for the selected sprinklers at the selected increments. At a next step 522, the system may then calculate the duty cycle for each sprinkler along the corner guidance path based on the determined sprinkler areas and extension ratios. At a next step 524, the system may then record in a look-up table each sprinkler on the corner by: sprinkler number; the pivot angle range based on the corner guidance path; and the extension ratios at each increment. At a next step 526, the valve duty cycles for each corner sprinkler may then be tabulated and recorded for each referenced pivot angle. At a next step 528, the irrigation plan may then be executed and the valve duty cycles for each corner sprinkler may be set to the tabulated values at each referenced pivot angle.

According to a first preferred embodiment, the simulated pass (and/or other steps discussed herein) may be completed using cloud or desktop type computing resources to perform desired calculations. For example, the simulated pass may preferably be performed via an IoT or cloud resource which may then generate the lookup table which would be loaded into the irrigation machine's (or corner's) computing/control device. Thereafter, the local machine device may utilize the loaded lookup table to execute the irrigation plan.

According to preferred embodiments, both the maximum required sprinkler flow rates and the currently required sprinkler flow rates may be determined by a number of computations/algorithms as the corner makes a simulated pass around the field. According to a first preferred embodiment, the valve duty cycle may be calculated as follows:

$$\text{Valve Duty Cycle (\%)} = \frac{\text{Current Required Sprinkler Flow}}{\text{Maximum Required Sprinkler Flow}} \times 100\% \quad \text{Formula 1.1}$$

According to a further preferred embodiment, the valve duty cycle is preferably calculated without the need to tabulate or measure the actual current flow rate of a given sprinkler. Instead, the present invention allows for the appropriate duty cycle for each valve to be tabulated for each increment along a prescribed corner guidance path of a given irrigation plan based on the determined sprinkler areas and extension ratios. Thereafter, as the tabulated prescription is executed, the valve duty cycle for each corner sprinkler is then preferably adjusted to the tabulated value for each reference pivot angle.

Accordingly, the system of the present invention may preferably tabulate each valve duty cycle using the following formula:

$$\text{Valve Duty Cycle (\%)} = \frac{\text{Current Sprinkler Area} \times \text{Current Extension Ratio}}{\text{Max Sprinkler Area} \times \text{Max Extension Ratio}} \times 100\% \quad \text{Formula 1.2}$$

Sprinkler Area Calculations

According to preferred embodiments, the sprinkler areas of the present invention may be calculated with reference to the in-radius and the out-radius for each sprinkler in the calculation, and then computed as the area of an imaginary circular shaped ring they makeup. The definition for the terms may be used as defined below:
- In Radius—Is the radial distance from the pivot point that is halfway between the sprinkler in question and the sprinkler inward of it.
- Out Radius—Is the radial distance from the pivot point that is halfway between the sprinkler in question and the sprinkler outward of it.

To determine the In Radius and Out Radius for each sprinkler, the system of the present invention may preferably first determine the radial distances to each corner sprinkler from center the pivot. This measurement may preferably be calculated with the formula below:

$$\text{Radial Distance to Corner Sprinkler from Pivot (ft.)} = \sqrt{\text{Distance to } LRDU \text{ (ft.)}^2 + (\text{Coupler Distance on Corner (ft.)})^2 - 2 * \text{Distance to } LRDU \text{ (ft.)} * \left(\text{Coupler Distance on Corner from Joint (ft.)} * \cos\left((\text{Corner Angle}) * \left(\frac{\pi}{180}\right)\right)\right)} \quad \text{Formula 1.3}$$

With the radial distances calculated, the In Radius and Out Radius for each sprinkler may then preferably be calculated by applying the formulas below to the respectively positioned corner sprinklers:

$$\text{First Corner Sprinkler In Radius} = D_{LS} + D_{PL} - \frac{1}{2}D_{LS} \quad \text{Formula 1.4}$$

where DLS is the radial distance to the last sprinkler on the machine; and DPL is the pipeline distance from the first corner sprinkler to the pivot (in feet).

Corner Sprinkler in Radius (ft.) =      Formula 1.5

$$\sqrt{\begin{array}{l}\text{Distance to } LRDU \text{ (ft.)}^2(\text{Straight In Radius to Sprinkler (ft.)} - \\ \text{Distance to } LRDU \text{ (ft.)})^2 - 2*\text{Distance to } LRDU \text{ (ft.)}* \\ (\text{Straight In Radius to Sprinkler (ft.)} - \text{Distance to } LRDU \text{ (ft.)}* \\ \cos\left((\text{Corner Angle})*\left(\frac{\pi}{180}\right)\right)\end{array}}$$

Corner Sprinkler Out Radius (ft.) =      Formula 1.6

$$\sqrt{\begin{array}{l}\text{Distance to } LRDU \text{ (ft.)}^2(\text{Straight Out Radius to Sprinkler (ft.)} - \\ \text{Distance to } LRDU \text{ (ft.)})^2 - 2*\text{Distance to } LRDU \text{ (ft.)}* \\ (\text{Straight Out Radius to Sprinkler (ft.)} - \text{Distance to } LRDU \text{ (ft.)}* \\ \cos\left((\text{Corner Angle})*\left(\frac{\pi}{180}\right)\right)\end{array}}$$

Last Corner Sprinkler Out Radius (ft.) =      Formula 1.7

$$\sqrt{\begin{array}{l}\text{Distance to } LRDU \text{ (ft.)}^2(\text{Straight Out Radius to End of Pipeline(ft.)} - \\ \text{Distance to } LRDU \text{ (ft.)})^2 - 2*\text{Distance to } LRDU \text{ (ft.)}* \\ (\text{Straight Out Radius to End of Pipeline (ft.)} - \text{Distance to } LRDU \text{ (ft.)}* \\ \cos\left((\text{Corner Angle})*\left(\frac{\pi}{180}\right)\right)\end{array}}$$

From the formulas 1.3-1.7, the appropriate In Radius and Out Radius for each sprinkler is preferably determined and the corner sprinkler areas for each sprinkler are then preferably calculated with the formula below.

$$\text{Corner Sprinkler Area (ac.)} \quad \text{Formula 1.8}$$
$$\text{Corner Sprinkler Area (ac.)} = \frac{(\pi*\text{radius}_{out})^2 - (\pi*\text{radius}_{in})^2}{43560}$$

Formula 1.8 is preferably then used to calculate the maximum and current corner sprinkler areas for each sprinkler. When calculating the maximum radial distance from pivot, the maximum corner angle is used. According to a preferred embedment, the maximum corner angle may typically be 162 degrees, but this could theoretically go up to 180 degrees, which would represent the corner span being straight out. For current calculations, the current corner angles are substituted.

Sprinkler Extension Ratio Calculation

According to a further preferred embodiment, the system of the present invention preferably calculates an extension ratio that a particular sprinkler is experiencing based on that of the SDU:LRDU extension ratio. The sprinklers closer to the LRDU approach a 1:1 extension ratio, while sprinklers closer to the SDU experience closer to that of the SDU. Sprinklers on the overhang will experience an extension ratio that is greater than that of the SDU when the corner is extending, and less than when retracting. First, the SDU:LRDU extension ratio (ER) is defined in Formula 1.8 below:

$$ER = \quad \text{Formula 1.8}$$
$$SDU:LRDU \text{ Extension Ratio} = \frac{\text{Distance Traveled by } SDU}{\text{Distance Traveled by } LRDU}$$

Figure 6:
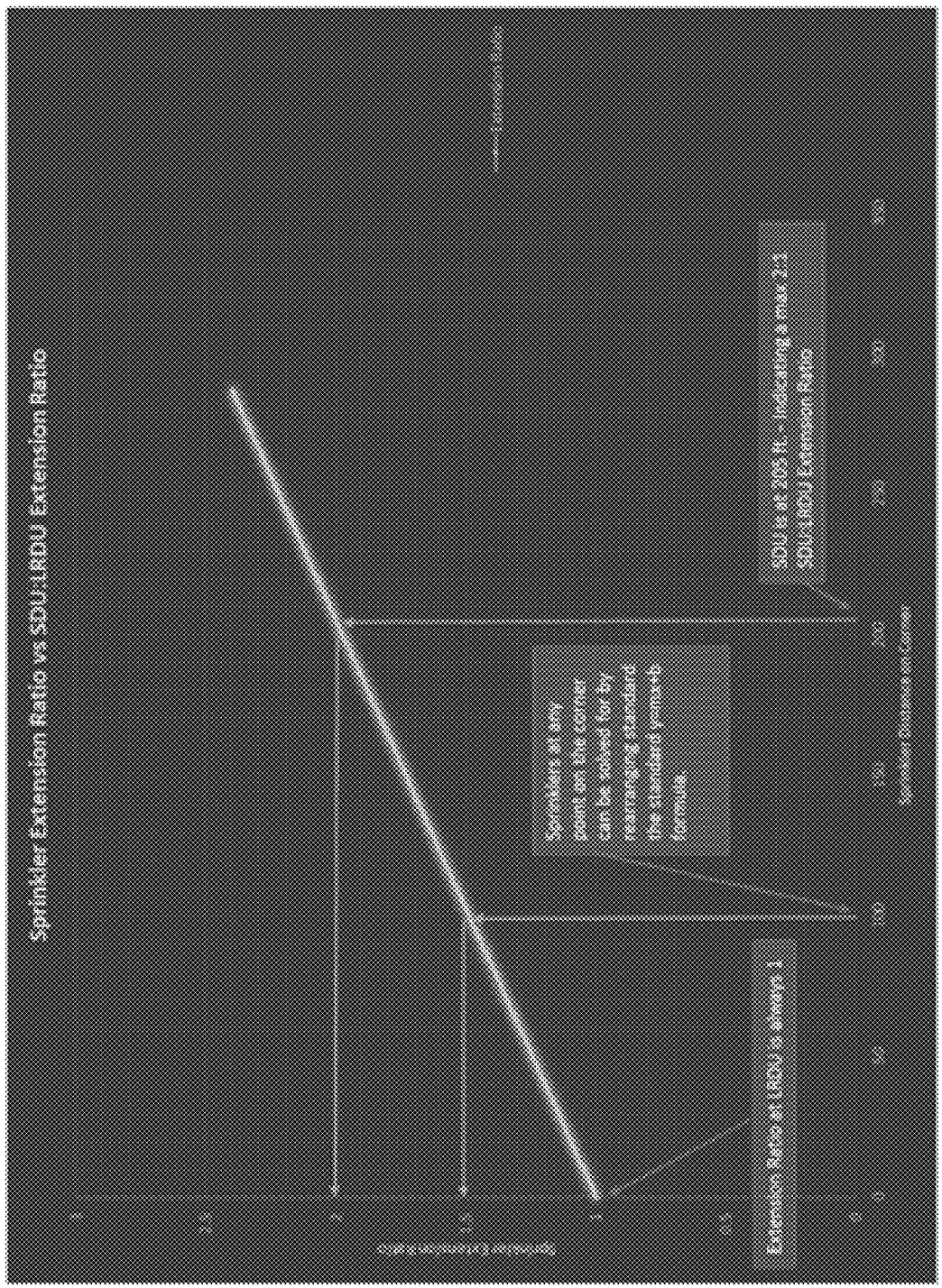
FIG. 6 is a chart illustrating the relationship between sprinkler distances and sprinkler extension ratios in accordance with the present invention.

Knowing the SDU:LRDU extension ratio ('ER'), the sprinkler extension ratio is then preferably calculated with Formula 1.9 below. As shown in FIG. 6, the sprinkler extension ratio maintains a linear relationship with the extension ratio of the SDU:LRDU and the LRDU always maintains an assumed extension ratio of '1' over the period of evaluation:

Sprinkler Extension Ratio =      Formula 1.9

$$\left[\frac{ER-1}{(\text{Corner Span Length})}\right]*(\text{Sprinkler Distance On Corner}+1)$$

In addition to the methods discussed above, aspects of the present invention may further be used to determine and control the allocation of water to different portions of the irrigation machine. Because of the adjustments made to accommodate the various extension ratios and provide greater/lesser flow rate to each corner sprinkler, other portions of the machine will have different water allocations than standard pivot systems. Accordingly, the present invention further teaches a method to determine and adjust for the corner water allocation. Specifically, the system of the present invention preferably calculates the sum of the SPRINKLER AREA×SPRINKLER EXTENSION RATIOS for each sprinkler on the corner. Thereafter, the system preferably computes the Base Flow/Area (GPM/Ac.) of the entire machine. An exemplary formula for this calculation is shown in Formula 2.1 below:

Base Flow/Area (GPM/Ac.)=Machine Flow Rate (GPM)/(Base Machine Area (Ac.)+End Gun Area (Ac.)+Drain Sprinkler Area (Ac.)+Corner Max Effective Area (Ac.)×(SUM (Corner Sprinkler Area (Ac.)×Extension Ratio)/SUM (Corner Sprinkler Area (Ac.))  Formula 2.1—

If devices such as an end gun or drain sprinkler are not present, they can simply be removed or treated as a null value.

Thereafter, knowing the Base Flow/Area (GPM/Ac.), the system may then have the basis to begin flow allocation between the different portions of the machine. Exemplary formulas for such flow allocation are included in Formulas 2.2-2.3 below.

Corner Sprinkler Flow Allocation (GPM)=Sprinkler Area (Ac.)×Sprinkler Extension Ratio×Base Flow/Area (GPM/Ac.)  Formula 2.2—

For other sprinklers on the machine, the extension ratios are understood to be 1 and therefore be ignored per Formula. 2.3 below.

Non-Corner Sprinkler Flow Allocation (GPM)= Sprinkler Area (Ac.)×Base Flow/Area (GPM/Ac.)  Formula 2.3—

While the above descriptions regarding the present invention contain much specificity, these should not be construed as limitations on the scope, but rather as examples. Many other variations are possible. For example, although the present system is discussed with regards to a self-propelled irrigation system, other irrigation systems may also incorporate the present invention without limitation. Further, the methods of the present invention may be used to control any number of sprinklers either individually or in groups. Accordingly, the scope of the present invention should be determined not by the embodiments illustrated, but by the appended claims and their legal equivalents.

What is claimed is:

1. A method for creating and executing an irrigation plan by a self-propelled irrigation system configured to create and execute an irrigation plan; the self-propelled irrigation system having at least one span and a drive system for moving the span, wherein the method comprises:
   recording irrigation system and irrigation field data by a data recording module; wherein the recorded data comprises: sprinkler ratings corner span dimensions, main span dimensions and field data;
   performing a simulated pass around a field by a simulation module; wherein the simulation module further executes a simulated irrigation plan along a selected corner guidance path;
   the simulation module determining a current and a maximum sprinkler area for selected sprinklers at selected points/increments along the selected corner guidance path; wherein the selected sprinklers comprise one or more corner sprinklers;
   the simulation module determining a current and a maximum extension ratio for the selected sprinklers at the selected increments;
   calculating a first set of duty cycles by a duty cycle calculation module; wherein the duty cycle calculation module is configured to calculate the first set of duty cycles for each selected sprinkler at each selected increment along the corner guidance path based on the determined sprinkler areas and extension ratios; wherein the duty cycle calculation module records duty cycles for each selected sprinkler at a first set of reference pivot angles;
   recording the first set of duty cycles in a look-up table;
   executing the irrigation plan by a control module; wherein the control module is configured to execute the irrigation plan by setting a first set of valve duty cycles for each selected sprinkler to the calculated first set of duty cycles at the corresponding first set of reference pivot angles during operation; and
   moving at least one span of the irrigation system by the drive system; wherein the drive system moves the irrigation system according to the selected corner guidance paths.

2. The method of claim 1, wherein the first set of valve duty cycles for at least a first selected sprinkler is calculated as follows:

$$\text{Valve Duty Cycle (\%)} = \frac{\text{Current Required Sprinkler Flow}}{\text{Maximum Required Sprinkler Flow}} \times 100\%.$$

3. The method of claim 2, wherein the first set of valve duty cycles are calculated without measuring a first actual flow rate for the first selected sprinkler.

4. The method of claim 2, wherein the first set of valve duty cycles are calculated for each increment along a prescribed corner guidance path of the irrigation plan based on the determined sprinkler areas and extension ratios.

5. The method of claim 4, wherein the current and maximum sprinkler areas for the selected sprinklers are calculated using an in-radius for the selected sprinklers; wherein the in-radius is calculated as follows:

Corner Sprinkler in Radius (ft.) =

$$\sqrt{\begin{array}{l}\text{Distance to } LRDU \text{ (ft.)}^2(\text{Straight In Radius to Sprinkler (ft.)} - \\ \text{Distance to } LRDU \text{ (ft.)})^2 - 2*\text{Distance to } LRDU \text{ (ft.)}* \\ (\text{Straight In Radius to Sprinkler (ft.)} - \text{Distance to } LRDU \text{ (ft.)})* \\ \cos\left((\text{Corner Angle})*\left(\frac{\pi}{180}\right)\right)\end{array}}$$

6. The method of claim 5, wherein the current and maximum sprinkler areas for the selected sprinklers are calculated using an out-radius for the selected sprinklers; wherein the out-radius is calculated as follows:

Corner Sprinkler Out Radius (ft.) =

$$\sqrt{\begin{array}{l}\text{Distance to } LRDU \text{ (ft.)}^2(\text{Straight Out Radius to Sprinkler (ft.)} - \\ \text{Distance to } LRDU \text{ (ft.)})^2 - 2*\text{Distance to } LRDU \text{ (ft.)}* \\ \left(\text{Straight Out Radius to Sprinkler (ft.)} - \text{Distance to } LRDU \text{ (ft.)}*\right. \\ \left.\cos\left((\text{Corner Angle})*\left(\frac{\pi}{180}\right)\right)\right)\end{array}}$$

7. The method of claim 6, wherein the out-radius for a last corner sprinkler is calculated as follows:

Last Corner Sprinkler Out Radius (ft.) =

$$\sqrt{\begin{array}{l}\text{Distance to } LRDU \text{ (ft.)}^2(\text{Straight Out Radius to End of Pipeline(ft.)} - \\ \text{Distance to } LRDU \text{ (ft.)})^2 - 2*\text{Distance to } LRDU \text{ (ft.)}* \\ \left(\text{Straight Out Radius to End of Pipeline (ft.)} - \right. \\ \left.\text{Distance to } LRDU \text{ (ft.)}*\cos\left((\text{Corner Angle})*\left(\frac{\pi}{180}\right)\right)\right)\end{array}}$$

8. The method of claim 7, wherein at least a first corner sprinkler area is calculated as follows:

$$\text{Corner Sprinkler Area } (Ac.) = \frac{(\pi * \text{radius}_{out})^2 - (\pi * \text{radius}_{in})^2}{43560}.$$

9. The method of claim 8, wherein the step of determining the current and maximum extension ratios for the selected sprinklers at the selected increments comprises calculating at least a first extension ratio (ER) as follows:

$$ER = SDU:LRDU \text{ Extension Ratio} = \frac{\text{Distance Traveled by } SDU}{\text{Distance Traveled by } LRDU}$$

wherein the SDU is a steerable drive unit and the LRDU is a last regular drive unit.

10. The method of claim 9, wherein the step of determining the current and maximum extension ratios for the selected sprinklers comprises calculating at least a first sprinkler extension ratio; wherein the first sprinkler extension ratio is calculated as follows:

$$\text{Sprinkler Extension Ratio} = \left[\frac{ER - 1}{(\text{Corner Span Length})}\right]*(\text{Sprinkler Distance On Corner} + 1).$$

11. The method of claim 10, wherein the sprinkler extension ratio maintains a linear relationship with the extension ratio of the SDU:LRDU.

12. The method of claim 11, wherein the method further comprises the steps of: determining the allocation of water between a first portion of the irrigation machine and a second portion of the irrigation machine.

13. The method of claim 12, wherein the method further comprises the step of: adjusting the allocation of water between the first portion of the irrigation machine and the second portion of the irrigation machine.

14. The method of claim 13, wherein the step of adjusting the allocation of water comprises calculating the sum of the SPRINKLER AREA×SPRINKLER EXTENSION RATIOS for the selected sprinklers.

15. The method of claim 14, wherein the step of determining the allocation water further comprises calculating the Base Flow/Area of the irrigation machine.

16. The method of claim 15, wherein the Base Flow/Area of the irrigation machine is calculated as follows:

Base Flow/Area (GPM/Ac.)=Machine Flow Rate (GPM)/(Base Machine Area (Ac.)+End Gun Area (Ac.)+Drain Sprinkler Area (Ac.)+Corner Max Effective Area (Ac.)×(SUM (Corner Sprinkler Area (Ac.)×Extension Ratio)/SUM (Corner Sprinkler Area (Ac)).

17. The method of claim 16, wherein a first corner sprinkler flow allocation (in GPM) is calculated as follows:

Corner Sprinkler Flow Allocation=Sprinkler Area (Ac.)×Sprinkler Extension Ratio×Base Flow/Area (GPM/Ac).

18. The method of claim 17, wherein at least a first non-corner sprinkler flow allocation is calculated is follows:

Non-Corner Sprinkler Flow Allocation=Sprinkler Area (Ac.)×Base Flow/Area (GPM/Ac).

\* \* \* \* \*